United States Patent Office 3,150,075
Patented Sept. 22, 1964

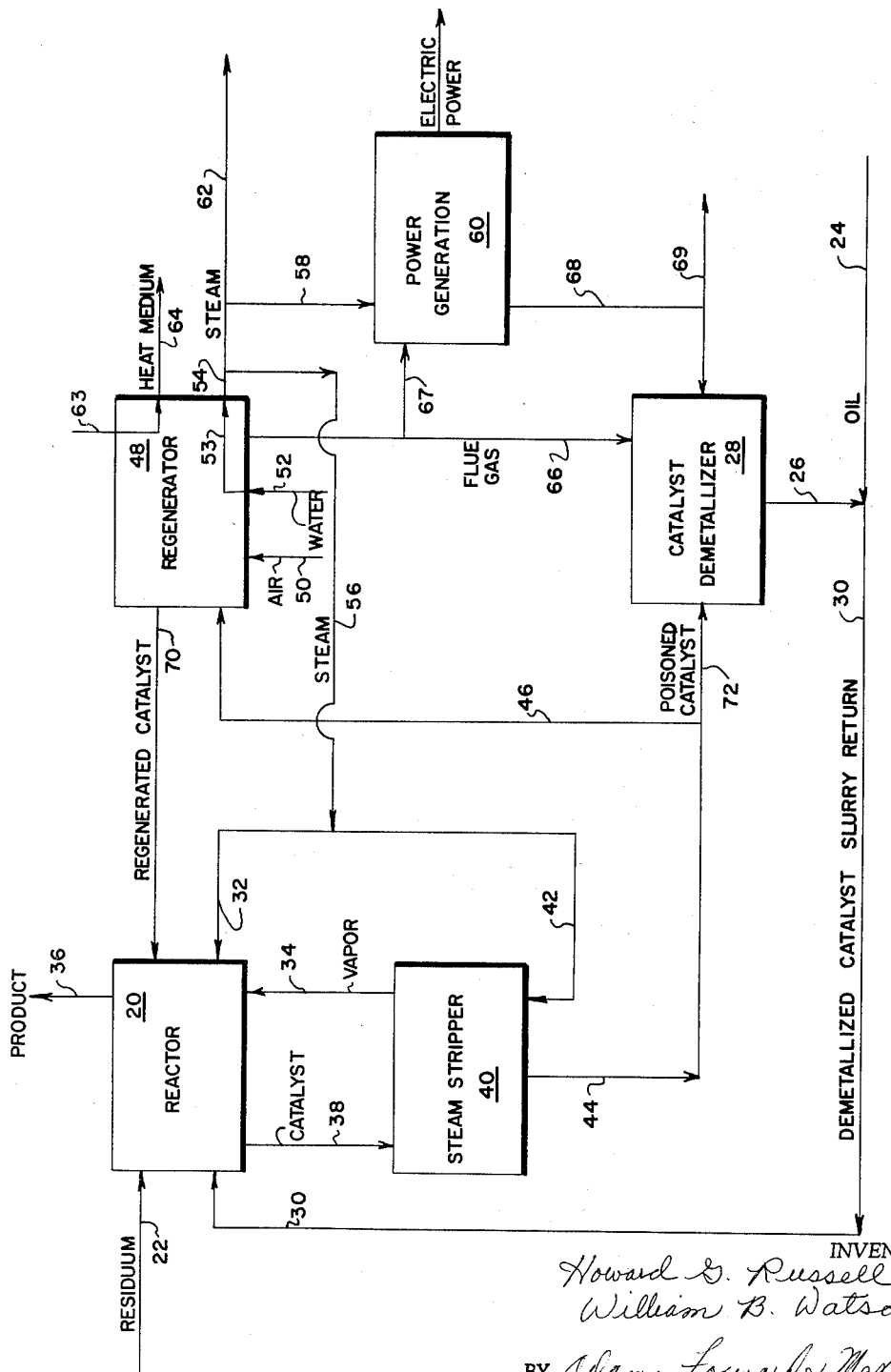

3,150,075
METHOD OF CRACKING HYDROCARBONS AND REACTIVATING THE METALLIC CONTAMINATED CATALYST
Howard G. Russell, Munster, Ind., and William B. Watson, Park Forest, Ill., assignors, by mesne assignments, to Sinclair Research, Inc., New York, N.Y., a corporation of Delaware
Filed Jan. 11, 1961, Ser. No. 82,076
12 Claims. (Cl. 208—120)

This invention is an improved procedure for the utilization of hydrocarbon feedstocks which contain large amounts of poisoning metals. Large quantities of mineral oil petroleum crudes, fractions thereof, and hydrocarbons derived therefrom, contain harmful amounts of metal impurities, such as nickel, vanadium and iron. These impurities are frequently present in such large amounts that utilization of the hydrocarbon as a catalytic cracking feedstock is a real problem since the metals accumulate on catalysts in cracking, adversely affecting the product distribution of cracking yields by increasing coke and gas make and decreasing gasoline make. Thus catalytic cracking of the hydrocarbons is uneconomical because the metal impurities harmfully affect selectivity of the catalyst. For this reason, such stocks have not heretofore been utilized to the fullest possible extent as cracking feedstocks, but rather have been diverted to use as a fuel to supply the power needs of the refinery, or have been sold for use as low-value fuels outside the refinery. In this invention heavy residual hydrocarbon oils containing more than about 1.5 parts per million of vanadium and/or more than about 0.6 part per million of nickel are converted by catalytic cracking in the presence of steam to lower-boiling products such as gasoline while depositing metal contaminants and about 20 to 60 lbs. of coke per barrel of feed on the catalyst. Cracked products are fractionated to remove gasoline and other desirable low-boiling cuts. Catalyst is continually circulated between the reactor and a large capacity regenerator. The heat given off in regeneration is used to make steam, some of which can be passed to the reactor as a diluent for cracking, some of which can be used to strip hydrocarbon values from the catalyst before it is regenerated, and some of which can be used for electric power generation by passage through a turbine. Heat in the regenerator may also be employed to produce a circulating heat medium. Catalyst is continually removed from the cracking system for demetallization. Thus by treating the heavy hydrocarbon feed, preferably a residual petroleum oil feed containing a high proportion of metal contaminants and coke-forming materials, to catalytic cracking, valuable gasoline and other low-boiling materials are produced while still supplying the power needs of the refinery. The flue gas from the regenerator can be employed in the catalyst demetallization process for drying catalyst.

The invention will be better understood by reference to the accompanying drawing which shows a schematic illustration of the invention but is not limiting thereof.

The petroleum residual oil is fed to the catalytic cracking reactor 20 by way of line 22, preferably directly from the crude oil stills (not shown). Some oil also is fed by line 24 to the exit line 26 from the catalyst demetallizer 28 to convey demetallized catalyst by line 30 to the reactor 20. Steam is fed to the reactor by line 32 and stripping steam, carrying vaporized hydrocarbons is conveyed to the reactor by line 34. Cracked products are withdrawn from the reactor by line 36.

Catalyst, containing relatively large amounts of coke and some poisoning metal, is continually withdrawn from the reactor 20 by line 38 which conducts the catalyst to stripping chamber 40. Steam enters this chamber from line 42 and passes countercurrently to the catalyst, picking up vaporizable hydrocarbons entrained in the catalyst. Catalyst, still containing coke and metal poisons, is withdrawn from the stripper by line 44 and the greater proportion is sent by line 46 to the regenerator 48. Air for burning off coke is conducted to the regenerator by line 50 and water or low temperature steam is introduced by line 52 to the heat exchanger 53 in the bed of catalyst. The water or low-pressure steam passes through the coil or other suitable apparatus in indirect heat exchange with the burning coked catalyst and is withdrawn as high temperature steam by the line 54, whence part of it may be conducted by line 56 to use in the reactor and/or stripper, part by line 58 to a turbine 60 for generation of electricity and part by line 62 to other uses in the refinery. Liquid heat exchange medium may be passed in indirect heat exchange with the burning coked catalyst through the line 63 and may be withdrawn by line 64 to any suitable use. Flue gases from the regenerator may be conducted by line 66 for use in the catalyst demetallizer as will be explained below, or by line 67 to the generator turbine. Also, exhaust steam from electricity generation may be brought by line 68 to the demetallizer for use as a diluent as will also be explained below. Alternately the exhaust steam may be taken by line 69 for general refinery uses.

Regenerated catalyst is returned to the cracking reactor by line 70. A slip stream of catalyst is continually removed from the line 44 for conveying to the demetallizer 28 by line 72.

As mentioned above, the need has been expressed in the art for a feasible process for the catalytic cracking of petroleum residua or similar heavy hydrocarbon feeds. The chief deterrent to catalytic cracking of residua by conventional means has been severe catalyst contamination, due to coke-formers and contaminant metals in most residua, which leads to poor catalyst activity and often to poor product distribution and otherwise reduces the desired effectiveness of the catalyst. This invention exploits or overcomes these disadvantages. It minimizes coke formation by steam dilution in the reactor and steam stripping of the spent catalyst; it recovers heat from coke which is still formed in large quantities; and it passifies the metal poisons in the feed by allowing the metals to be deposited on the catalyst and demetallizing the catalyst. This invention may provide for the elimination of steam generating boilers and other facilities in the refinery.

One of the most important phases of the study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present, including some iron, petroleum stocks have a tendency to pick up tramp iron from transportation, storage and processing equipment. Because most of these metals, when present in a stock, would deposit in a relatively non-volatile form on the catalyst during the conversion processes and regeneration of the catalyst to remove coke would not remove these contaminants, feeds containing relatively large quantities of metal compounds and contaminants are generally avoided. Iron, nickel, vanadium and copper, for example, markedly alter the selectivity and activity of cracking reactions if allowed to accumulate, producing a higher yield of coke and hydrogen at the expense of desired products, such as gasoline and butanes.

When an attempt is made to segregate higher boiling distillate fractions of a crude oil, it is found that the metal contaminants tend to concentrate in the heavier fraction or residuum. A minor portion of metal contaminants is inherently and unavoidably carried over into the distillate products, but such distillate fractions are frequently used as cracking feedstocks, with the catalyst poisoning problem being solved by high rates of catalyst replacement. Contaminated residual fractions are generally used as sources of asphalt, fuel, and other products which are of relatively low economic value and where the high carbon-to-hydrogen ratio and the presence of metal contaminants are not unduly harmful. Contaminated crudes or other residuals therefore are not usually fully exploited as cracking feeds. This invention, however, provides for the upgrading of such residual material to gasoline and other desirable products by an economically feasible process, while still deriving considerable fuel value from the residual.

Solid oxide catalysts, both naturally occurring activated clays and synthetically prepared gel catalysts, as well as mixtures of the two types, have long been recognized as useful in catalytically promoting conversion of hydrocarbons. A popular "natural" catalyst is "Filtrol" which is acid-activated montmorillonite. For cracking processes, the solid oxide catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. The use of wholly or partially synthetic gel catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be made only partially of synthetic material; for example it may be made by the precipitation of silica-alumina on clay, such as kaolinite or halloysite. One such semi-synthetic catalyst contains about equal amounts of silica-alumina gel and clay.

The physical form of the catalyst varies with the type of manipulative process to which it will be exposed. In fluid catalytic processes gases are used to convey the catalyst in the form of a fine powder, generally in a size range of about 20 to 150 microns. In the "TCC" or "Thermofor" process the catalyst is in the form of beads which are conveyed by elevators. Generally these beads may range in size up to about ½″ in diameter. When fresh, the minimum sized bead is generally about ⅛″. Other types of process use other forms of catalyst such as tablets or extruded pellets. The cracking process of this invention preferably uses the fluidized solids technique.

The feeds to the present process comprise residua which include the crude fraction boiling primarily above about 800° F. and may be exemplified by vacuum residua, atmospheric residua, tars, pitches, etc. These materials boil essentially above about 400° or even above about 600° F., and in general have a higher carbon-to-hydrogen ratio and contain greater amounts of poisoning metals than found in distillate oils. The feed often has an API gravity in the range of about 0° to 25°, a Conradson carbon content in the range of about 3 to 35 weight percent and a viscosity above about 75 or even 200 seconds Saybolt Furol at 210° F., and a high carbon-to-hydrogen ratio generally above about 7.25 and even above about 8.0.

The feed may be the entire portion of the residual remaining after the light ends (the portion boiling up to about 400° F.) have been removed from the crude oil; therefore, such a fraction may include the entire gas oil fraction (400° F. to 1100–1200° F.) and the undistilled portion of the residual boiling above about 1100–1200° F. These charge stocks, which contain more than about 1.5 parts per million of vanadium and/or more than about 0.6 part per million of nickel are generally avoided in cracking processes and most refiners prefer less than about 0.5 part per million of vanadium or about 0.2 part per million of nickel in the cracking stock. Metal contents above these ranges may be present in feeds to the process of this invention; it will be apparent that oils having metal contents and coking tendencies in these generally undesirable ranges are the oils which this invention salvages. A mixture of vanadium and nickel may be considered as harmful as a single metal even though the individual amounts of each metal are below the values mentioned above because the effect of the total amount of the metallic components is frequently sufficient to give harmful effects during catalytic cracking. In most cases, however, the total of one, or both of these metals in the residual will be at least about 0.6 p.p.m. The maximum amount of metals in the residuals can vary widely; most often the maximum amount of these poisoning metals in the residual stock will not exceed about 25–50 p.p.m. nickel, and about 50–100 p.p.m. vanadium.

The feed is passed to the cracking zone below or at the cracking temperature; it may be heated to a temperature of, say, about 600 to 700° F. before introduction to the cracking zone. This temperature is generally not sufficient to vaporize all of the feedstock. The cracking is generally conducted under fluidized catalyst conditions while continually removing from the cracker a vaporous effluent product which contains no significant amount of poisoning metals. The catalytic treatment is conducted under more or less conventional fluid catalytic cracking conditions including a temperature of about 850° to 1000° F., preferably about 900 to 950° F., and a pressure between about 5 and 25 or more p.s.i.g., at a weight hourly space velocity from about 0.1 to 10 to obtain about a 35–65 volume percent conversion of the 400° F.+ feed to materials boiling in the gasoline ranges and to deposit about 20 to 60 pounds of coke on the catalyst per barrel of feed. The vaporous effluent product is conducted to a fractionator, with or without intermediate cooling. In the fractionation, the lower boiling gasoline constituents of the cracker effluent having an approximate 375°–430° F. end point are vaporized and removed from the system and may be used as gasoline blending components or other products. The additional normally liquid hydrocarbon may be recycled to cracking or withdrawn from the system.

Even though coke formation is held to a minimum in cracking by the use of a steam diluent, large amounts of coke deposit on the catalyst. As mentioned, about 20 to 60 pounds of coke are deposited on the catalyst per barrel of residual feed sent to the cracker. More usually the amount is about 25 to 40 pounds of coke deposited per barrel of feed. Regeneration to remove this coke requires a departure from conventional practices. Regeneration of a catalyst to remove carbon is a relatively quick procedure in most commercial catalytic conversion operations. Average residence time of a particle of catalyst in the regenerator may be kept to the same short time in this process provided that only the same small amount of coke is allowed to accumulate on the catalyst as in a conventional cracking system. Such a result may be obtained by increasing the catalyst inventory in the cracking system and the catalyst-to-oil ratio and the catalyst circulation rate. If it is preferred to maintain the conventional inventory, catalyst-to-oil ratio and catalyst circulation rate, the average residence time for catalyst in the regenerator is increased in order to burn off the increased amount of coke on the catalyst. In either alternative, a regenerator must be provided which is far larger than those generally found associated with catalytic cracking units to provide either the longer average residence time for catalyst in the regenerator, or the conventional residence time for a larger catalyst inventory.

The steam used as diluent in the cracking is obtained from steam formed in the catalyst regenerator. Advantageously steam comprises up to about 50 weight percent or even up to about 65% of the vapors in the cracking reactor, preferably about 20 to 40%, based on the hydrocarbon vapors and steam. As little steam as about 5–10% may be found useful. A high steam partial pressure in the reactor and good stripping of catalyst removed from the reactor by further amounts of steam from the regenerator, serve to hold down coke formation, but the coke production is still high. The variables of catalyst circulation rate and ratio to oil are adjusted so that catalyst sent to the regenerator contains no more than about 5% carbon. A greater amount of carbon than this results in severe reduction in catalyst cracking activity. Usually catalyst sent to regeneration will contain an average of no more than about 3.5% carbon.

In the regenerator catalyst is contacted with air at about 950 to 1200° F., more usually about 1000 to 1150° F. Combustion of coke from the catalyst is rapid, and for reasons of economy only enough air is used to supply the needed oxygen. Average residence time for a given portion of catalyst in regeneration may be on the order of about 5 to 15 minutes and the oxygen content of the effluent gases from the regenerator is desirably in the range of about 0.5 to 5%, preferably less than about 2%. Regeneration reduces the carbon content of the catalyst to about 0.5% or less.

As mentioned, a minor portion of the catalyst, preferably after regeneration, is continuously removed as a side stream from the cracking system and is sent to a demetallization system. Generally a high demetallization rate is employed, which may be in the range of about 20–200% of catalyst inventory daily; that is, as little as one-fifth of the amount of catalyst in the system may each day pass to the demetallization system, or twice the amount of the catalyst inventory may each day pass to demetallization. A number of procedures have become available which provide for the removal of the common metal poisons nickel and vanadium from a contaminated hydrocarbon conversion catalyst. Such procedures frequently involve contact of the catalyst at elevated temperatures with vapors reactive with the poisoning metal on the catalyst and are described, for example, in copending applications Serial Nos. 763,834, filed September 29, 1958, now abandoned; 767,794, filed October 17, 1958; 849,199, filed October 28, 1959, now abandoned; 842,618, filed September 28, 1959, now abandoned; 19,313, filed April 1, 1960, now abandoned; 39,810, filed June 30, 1960; 47,598, filed August 5, 1960; 53,623, filed September 2, 1960; 55,129, filed September 12, 1960; 55,160, filed September 12, 1960; 53,380, filed September 1, 1960; 54,532, filed September 7, 1960, now abandoned; all of which are herein incorporated by reference. It has been found, for example, that Ni, and V may be removed from a catalyst by converting the metals into volatile compounds; a chlorination treatment can convert vanadium to volatile chlorides, as reported in copending applications Serial Nos. 849,199, and 54,532, and nickel may be converted to the volatile nickel carbonyl by hydrogenation and treatment with carbon monoxide, as pointed out in copending application Serial No. 47,598.

It has also been found that Ni, and V may be removed from a catalyst by certain aqueous media; a basic aqueous wash containing ammonium ions is suitable for removal of V poisons as reported in copending application Serial No. 39,810, filed June 30, 1960. The removal of nickel may be accomplished by the use of a slightly acid aqueous wash when the nickel is first converted into a compound dispersible in such a wash. The chlorination treatment can convert nickel to the soluble chloride form. Also, a poisoned catalyst may be reduced in nickel content by the aqueous wash when nickel contaminants are put into the sulfate or other dispersible form by oxidizing a sulfided nickel-contaminated catalyst. Such an oxidation may be performed by an oxidizing vapor, as disclosed in copending applications Serial Nos. 763,834, 55,129, or by an aqueous oxidizing agent, as explained in copending application Serial No. 842,618. Sulfidation of nickel poisoned catalyst appears to have important effects in making more nickel available for removal, so that sulfidation, as described in the latter two copending applications and in application Serial No. 53,380, may be performed when the nickel removal is by a route other than conversion to sulfate. Also, as pointed out in copending applications Serial No. 19,313 and Serial No. 55,160, a preliminary treatment of the catalyst with molecular oxygen-containing gas is of value in improving the vanadium removed by subsequent procedures. The treatment may remove a substantial part of one or more of these metals, preferably all three, or at least nickel and vanadium. The withdrawal of catalyst from the cracking system can be on a continuous or intermittent basis and ordinarily the catalyst will not be allowed to accumulate more than about 5000 or 7500 p.p.m. of poisoning metal. Subjecting the poisoned catalyst sample to magnetic flux may be found desirable to remove any tramp iron particles which may have become mixed with the catalyst.

Treatment of the regenerated catalyst with molecular oxygen-containing gas is described in copending applications, Serial Nos. 19,313, and 55,160, hereby incorporated by reference. The temperature of this treatment is generally in the range of about 1000 to 1800° F. but below a temperature where the catalyst undergoes any substantial deleterious change in its physical or chemical characteristics. The catalyst is in a substantially carbon-free condition during this high-temperature treatment and there is substantially no oxygen consumption. If any significant amount of carbon is present in the catalyst at the start of this high-temperature treatment, the essential oxygen contact is that continued after carbon removal. In any event, after carbon removal, the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. This increase is over and above that which would have been obtained by the other metals removal steps without the oxygen treatment.

The treatment of the vanadium-poisoned catalyst with molecular oxygen-containing gas is preferably performed at a temperature of about 1150 to 1350 or even as high as 1600° F. and at least about 50° F. higher than the regeneration temperature. The oxygen-containing gas used in the treatment contains molecular oxygen as the essential active ingredient. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 2 atmospheres. The factors of time, partial pressure and extent of vanadium conversion may be chosen with a view to the most economically feasible set of conditions. It is preferred to continue the oxygen treatment for at least about 15 or 30 minutes with a gas containing at least about 1%, preferably at least about 10% oxygen. The catalyst may pass directly from the oxygen treatment to an ammonia wash as described below for satisfactory vanadium removal especially where this is the only important contaminant, as may be the case when the residum cracked is derived, for example, from Venezuelan crude.

Conversion of the metal poisons to the sulfate or other dispersible form is described in copending applications Serial No. 763,834, and Serial No. 842,618, hereby incorporated by reference, and may be accomplished, for instance, by subjecting the catalyst to a sulfating gas, that is, $SO_2$, $SO_3$ or a mixture of $SO_2$ and $O_2$, at an elevated temperature. Sulfur oxide contact is usually performed at a temperature of about 500 to 1200° F. and frequently it is advantageous to include some free oxygen in the treating gas. Another procedure includes sulfiding the catalyst and converting the sulfide by an oxidation process, after which metal contaminants in dispersible form may be removed from the catalyst by an aqueous medium.

A sulfiding can be performed by contacting the poisoned catalyst with elemental sulfur vapors, or more conveniently by contacting the poisoned catalyst with a volatile sulfide, such as $H_2S$, $CS_2$, or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 2 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent, as well as the rate of diffusion within the catalyst matrix.

The sulfiding step performs the function not only of supplying a sulfur-containing metal compound which may be easily converted to the sulfate or other dispersible form but also apparently serves to concentrate some metal poisons, especially nickel, at the surface of the catalyst particle.

Oxidation after sulfiding may be performed by a gaseous oxidizing agent to convert metal sulfide to sulfate, including oxysulfate, or other dispersible form. Gaseous oxygen, or mixtures of gaseous oxygen with inert gases such as nitrogen, may be brought into contact with the sulfided catalyst at an oxygen partial pressure of about 0.2 atmospheres and upward, temperatures upward of room temperature and usually not above about 1300° F., and times dependent on temperature and oxygen partial pressure. Gaseous oxidation is best carried out near 900° F., about one atmosphere $O_2$ and at very brief contact times. Alternatively, the sulfided catalyst may be treated at a temperature of about 220 to 1150° F., preferably about 400° to 600° F., with a mixture of oxygen-containing gas and steam from the regenerator, or exhaust steam from the electric generator turbine. Such a mixture generally will contain at least about 50% steam, preferably about 65–95% steam and about 0.01 to 10%, preferably about 0.5 to 7%, oxygen.

The metal sulfide may be converted to the corresponding sulfate, or other dispersible form, by a liquid aqueous oxidizing agent such as a dilute hydrogen peroxide or hypochlorous acid water solution as described in copending application Serial No. 842,618, filed September 28, 1959. Bromine, chlorine, or iodine water, or aerated, ozonated or oxygenated water, with or without acid, also will oxidize the sulfides to sulfates or other dispersible form. The inclusion in the liquid aqueous oxidizing solution of sulfuric acid or nitric acid has been found greatly to reduce the consumption of peroxide. In addition, the inclusion of nitric acid in the oxidizing solution frequently provides for increased metal removal. Useful proportions of acid to peroxide to catalyst generally include about 2 to 25 pounds acid (on a 100% basis) to about 1 to 30 pounds or more $H_2O_2$ (also on a 100% basis) in a very dilute aqueous solution, to about one ton of catalyst. A 30% $H_2O_2$ solution in water seems to be an advantageous raw material for preparing the aqueous oxidizing solution. Another highly advantageous oxidizing medium is an aerated dilute nitric acid solution in water. Such a solution may be provided by continuously bubbling air into a slurry of the catalyst in very dilute nitric acid. Other oxygen-containing gases may be substituted for air. The time required for oxidation is generally at least about 7 to 8 minutes. The oxidation slurry may contain about 20% solids and provide about five pounds of nitric acid per ton of catalyst. The liquid phase oxidation may also be performed by exposing the sulfided catalyst first to air and then to the aqueous nitric acid solution. The conditions of oxidation can be selected as desired. The temperature can conveniently range up to about 220° F. with temperatures of above about 150° F. being preferred. Contact with the hot catalyst may be sufficient to raise the temperature of the slurry from ambient temperature to around the boiling point. Temperatures above about 220° F. necessitate the use of superatmospheric pressures and no need for such has been found.

Sometimes removal of sulfides from the catalyst may be accomplished by contacting the catalyst with an appropriate solvent. Such procedures are described in copending application Serial No. 763,833, now abandoned, incorporated herein by reference. These solvents are in general aqueous and may contain a complexing or chelating agent for the nickel and/or other metal poisons. Aqueous solutions containing cyanide or hexametaphosphate ions are useful in forming soluble complexes with the poisoning metals. Organic sequestering agents, such as ethylene diamine tetraacetic acid (EDTA), etc. have been found useful in removing the sulfided metals since they form soluble chelate complexes with the metals and effectively retard redeposition of the poisoning metals on the catalyst surface once they are brought into solution. The liquid phase aqueous medium may be applied to the sulfided catalyst at any temperature from ambient temperature upwards. Elevated temperatures approaching the boiling point of water are preferred. Also, it has been found desirable sometimes to impart oxidation characteristics to the wash containing a chelating agent.

It has further been found that treatment of a metals-contaminated catalyst with a chlorinating agent at a moderately elevated temperature is of value in removing vanadium and iron contaminants from the catalyst as volatile chlorides. This treatment is described in copending application Serial No. 849,199. Generally, the major proportion of these volatile chlorides is removed during contact with the chlorinating vapor and where the volatile chlorides are insufficiently removed, a purge with an inert gas such as nitrogen at an elevated temperature or flue gas from the regenerator may be applied to the chlorinated catalyst. A conversion to vanadium chloride after the high temperature oxygen and/or sulfiding treatment preferably makes use of vapor phase chlorination at a moderately elevated temperature wherein the catalyst composition and structure is not materially harmed by the treatment and a substantial amount of the poisoning metals content is converted to chlorides. The chlorination takes place at a temperature of at least about 300° F. to say about 1000° F., preferably about 550 to 650° F., with optimum results being obtained close to about 600° F. The chlorinating reagent is a vapor which contains chlorine, preferably in combination with carbon or sulfur. Such reagents include molecular chlorine but preferably are the chlorine substituted light hydrocarbons, such as carbon tetrachloride, which may be used as such or formed in situ by the use of, for example, a vaporous mixture of chlorine gas with low molecular weight hydrocarbons such as methane, ethane and propane. The chlorination may take about 5 to 120 minutes, more usually about 20 to 60 minutes, but shorter or longer reaction periods may be possible or needed; for instance, depending on the linear velocity of the chlorinating and purging vapors.

Nickel poison may be removed by conversion of the nickel sulfide to the volatile nickel carbonyl by treatment with carbon monoxide, as described in copending application Serial No. 47,598, incorporated herein by reference. In such a procedure the catalyst is treated with hydrogen at an elevated temperature during which nickel contaminant is reduced to the elemental state, then treated, preferably under elevated pressure and at a lower temperature, with carbon monoxide, during which nickel carbonyl is formed and flushed off the catalyst surface.

Hydrogenation takes place at a temperature of about 800 to 1600° F., at a pressure from atmospheric or less up to about 1000 p.s.i.g. with a vapor containing 10 to 100% hydrogen. Preferred conditions are a pressure up to about 15 p.s.i.g. and a temperature of about 1100 to 1300° F. and a hydrogen content greater than about 80 mole percent. The hydrogenation is continued until surface accumulations of poisoning metals, particularly nickel, are substantially reduced to the elemental state.

Carbonylation takes place at a temperature substantially lower than the hydrogenation, from about ambient temperature to 300° F. maximum and at a pressure up to about 2000 p.s.i.g., with a gas containing about 50-100 mole percent CO. Preferred conditions include greater than about 90 mole percent CO, a pressure of up to about 800 p.s.i.g. and a temperature of about 100-180° F. The CO treatment generally serves to convert the elemental metals, especially nickel, to volatile carbonyl and to remove the carbonyl.

After the conversion of some of the poisoning metal to a form soluble or dispersible in an aqueous medium, the catalyst can be washed with such aqueous medium to remove metal sulfate, nitrate, etc. or the soluble metal chloride produced in the chlorination procedure described above. This aqueous wash medium will preferably be somewhat acidic, and this character can be imparted, at least initially, due to the presence of the acid-acting salt or some entrained acidic oxidizing agent on the catalyst. Ambient temperatures can be used in the wash. Pressures above atmospheric may be used but the results usually do not justify the additional equipment. Where an aqueous oxidizing solution is used, the solution may perform part or all of the metal compound removal simultaneously with the oxidation. In order to avoid undue solution of alumina from the catalyst, when the metal poisons have been converted to the chlorides, contact time is preferably held to about 3 to 5 minutes which is sufficient for nickel removal. Also, since a slightly acidic solution is desirable for nickel removal, this wash preferably takes place before an ammonium wash, hereinafter described.

Vanadium may be removed from the catalyst by washing it with a basic aqueous solution as described in copending application Serial No. 39,810, incorporated herein by reference. The pH is frequently greater than about 7.5 and the solution preferably contains ammonium ions which may be $NH_4+$ ions or organic-substituted $NH_4+$ ions such as methyl ammonium and quaternary hydrocarbon radical ammoniums. An aqueous solution of ammonium hydroxide is preferred. The preferred solutions have a pH of about 8 to 11. The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. After a wash treatment the catalyst slurry can be filtered to give a cake which may be reslurried with water or rinsed in other ways, such as, for example, by a water wash on the filter, and the rinsing may be repeated, if desired, several times.

After demetallization, the catalyst is conducted back to cracking, for instance, to the hydrocarbon conversion reactor or catalyst regenerator, although it may be desirable first to dry the catalyst filter cake or filter cake slurry at say about 250 to 450° F. and also, prior to reusing the catalyst in the conversion operation it can be calcined, say at temperatures usually in the range of about 700 to 1100° F. A fluidized solids technique is recommended for the sulfiding and other vapor contact processes used in any selected demetallization procedure as a way to shorten the time requirements. After the available catalytically active poisoning metal has been removed, in any removal procedure, further reaction time may have relatively little effect on the catalytic activity of the depoisoned catalyst, although further metals content may be removed by repeated or other treatments or by increasing the demetallization rate, that is, the fraction of catalyst inventory sent to demetallization per unit time. Inert gases frequently may be employed after contact with reactive vapors to remove any of these vapors entrained in the catalyst or to purge the catalyst of reaction products and preferably these gases are those obtained from other parts of the residual cracking system; viz., steam or flue gas or a mixture of these from the regenerator and/or exhaust steam from the electric generator turbine. Any given step in the demetallization treatment is usually continued for a time sufficient to effect a substantial conversion or removal of poisoning metal and ultimately results in a substantial increase in metals removal compared with that which would have been removed if the particular step had not been performed. The actual time or extent of treating depends on various factors and is controlled by the operator according to the situation he faces, e.g. the extent of metals content in the feed, the level of conversion unit tolerance for poison, the sensitivity of the particularly catalyst toward a particular phase of the demetallization procedure, etc.

The amount of Ni, or V removed in practicing the procedures outlined or the proportions of each which are removed may be varied by proper choice of treating conditions. If may prove necessary, in the case of very severely poisoned catalysts, to repeat the treatment to reduce the metals to an acceptable level, perhaps with variations where one metal is greatly in excess. Generally, the demetallization processes outlined remove about 10-70% of the metal poisons on a catalyst. Preferably 15-30% of the vanadium and/or 40-60% of the nickel is removed. A further significant advantage of these demetallization techniques lies in the fact that the overall metals removal operation, even if repeated, usually does not unduly deleteriously affect the activity, selectivity, pore structure and other desirable characteristics of the catalyst.

The present invention will be further described with reference to the following examples which are not to be considered limiting.

*Example I*

A 40% reduced North Texas petroleum crude having an API gravity of about 22, a Conradson carbon of about 5 weight percent, a viscosity of about 100 seconds Saybolt Universal at 210° F., and an initial boiling point above about 650° F. at atmospheric pressure, and containing 25.0 p.p.m. of nickel and 60 p.p.m. of vanadium is preheated to about 600 to 700° F., and introduced into a reactor mixed with a finely divided cracking catalyst and about 100 lbs. steam/bbl. feed for dispersion and stripping. The steam is obtained from the regenerator. The catalyst introduced into the feed line is a "Nalcat" synthetic gel cracking catalyst containing about 25% $Al_2O_3$, the balance silica, and having fluidizable particle size.

Cracking conditions are a temperature of about 925 to 950° F., a pressure of about 5 p.s.i.g., and a weight hourly space velocity of about 0.1 to 1. The cracked products are introduced to a fractionator where a 50% yield of gasoline and light hydrocarbon gases based on the feed to the cracker are removed. The fractionation residue is recycled to the cracker for further processing. About 25 pounds of coke are laid down on the catalyst per barrel of feed sent to the cracker. A portion of the silica-alumina catalyst is continually removed from the cracking reactor to a stripping zone where it is passed countercurrently to a flow of steam from the regenerator. The exhaust vapors from the stripping zone are passed to the cracking reactor and the catalyst, having an average carbon content of about 2.8%, is sent to a regenerator having a heat exchange coil, where it is contacted with air at about 1050° F. to burn off the carbon. Water is injected into the heat exchange coil passing in indirect heat exchange with the bed of catalyst. The water serves both to control the temperature at about 1100° F. in the regenerator and to produce about 190 pounds of steam per barrel of hydrocarbon feed to the reactor. Sufficient steam, as described above, is passed to the cracking reactor and stripping zone to minimize coke laydown and remove entrained hydrocarbons from the catalyst. The remainder of the steam is sent to a steam-driven turbine for generation of electric power or for other use in the refinery.

A side stream of regenerated catalyst having a carbon content of about 0.4%, 540 p.p.m. nickel, and 3000 p.p.m. vanadium is continuously removed from the regenerator at a daily rate equivalent to 75% of total catalyst inventory and sent to the demetallization unit. In the demetallization unit the catalyst is first held for about an hour in contact with air at about 1300° F. and then sent to a sulfiding zone where it is fluidized with $H_2S$ gas at a temperature of about 1175° F. for about an hour and chlorinated in a chlorination zone with an equimolar mixture of $Cl_2$ and $CCl_4$ at about 600° F. for about 1 hour. During chlorination volatile vanadium compounds are removed with the gaseous effluent. The catalyst is then slurried with water. A pH of about 2 is imparted to this wash medium by chlorine entrained in the catalyst and the wash serves to remove nickel chloride.

The catalyst, substantially reduced in nickel and vanadium content, is filtered from the wash slurry, dried at about 350° F. and returned to the regenerator. The treated catalyst is analyzed and shows a metals content of 215 p.p.m. nickel, and 2250 p.p.m. vanadium.

*Example II*

In another run a vacuum residuum was employed, derived from a West Texas crude oil and having an API gravity of 15.1, a Conradson carbon content of about 8.8 weight percent, a viscosity of about 400 seconds Saybolt at 210° F., and an initial boiling point above about 1000° F. and containing 24.7 p.p.m. of nickel and 39.9 p.p.m. of vanadium. A mixture of residuum and steam from the regenerator having a 1 to 1 volume ratio is mixed with the cracking catalyst having a particle size range of about 20 to 150 microns. The cracking catalyst comprised a synthetic silica-alumina composite containing about 13% alumina. The total linear superficial gas velocity in the fluidized bed is about 1 to 2 ft./sec. The feed is introduced into a catalytic cracking zone at a temperature of about 950° F. and a pressure of about 10 p.s.i.g. with a WHSV of about 5 to give a conversion to gasoline of 55% by volume of the oil introduced into the cracking zone. A portion of the silica-alumina catalyst is continually removed from the reactor where it is introduced into a regenerator having a heat exchange coil in the catalyst bed and kept in a free-oxygen-containing gas at about 1050° F. for an average residence time of about 10 minutes to reduce its carbon content from about 3.2 to 0.5 weight percent, through contact with air in the regenerator. Water is injected into the heat exchange coil and steam is removed from the coil. Some steam is sent for mixing with the feed to the cracker while the rest is sent to a turbine for electricity generation and other uses in the refinery.

A slip stream of regenerated catalyst analyzing 0.5% coke, 670 p.p.m. nickel and 2500 p.p.m. vanadium is continuously withdrawn from the regenerator at a daily rate of 60% of total catalyst inventory and sent to demetallization where it is held for about 2 hours in a zone where it is contacted with air at about 1300° F. and then sent to a sulfiding zone where it is fluidized at a temperature of about 1175° F. for about 1 hour with $H_2S$. The catalyst is then contacted with a mixture containing about 50% air and 50% exhaust steam (temperature 500° F.) from the electricity-generating steam turbine. Water containing nitric acid is brought in contact with the sulfided catalyst for 10 minutes at a temperature of 200° F. and then water washed. The catalyst is then washed with an ammonium hydroxide solution having a pH of about 8 to 11, removing the available vanadium. The metals level of the cracking catalyst after demetallization analyzes 270 p.p.m. nickel and 1875 p.p.m. vanadium.

The cracked products are introduced into a fractionator where the products are separated into a gasoline fraction having an end boiling point of 430° F. which is recovered, and a cycle oil fraction boiling between about 400° F. and 950° F. The cycle oil is recycled to the cracking reactor. Part of the flue gas produced in the regenerator is conducted to the demetallization system as indicated for drying the catalyst.

It is apparent from the foregoing that it is now possible to provide a process for the conversion in a high yield of residua containing metallic impurities which have harmful effects on the selectivity of a cracking catalyst, while still exploiting a good deal of the fuel value of the residua by treating the residuum in a cracking unit having associated with this unit demetallization facilities to keep the metallic content of the catalyst below harmful levels, followed by recovery of heat values during catalyst regeneration.

It is claimed:

1. A process for catalytically cracking a hydrocarbon feedstock to obtain gasoline, said feedstock consisting essentially of residual petroleum hydrocarbon having a boiling point essentially above about 400° F. and containing more than 1.5 to 100 parts per million of vanadium and more than about 0.6 to 50 parts per million of nickel which comprises subjecting said feedstock and about 10 to 65 percent by weight of said feedstock of steam to fluidized catalytic cracking employing a synthetic gel, silica-alumina cracking catalyst of fluidizable particle size under conditions to produce conversion of about 35 to 65 percent of the feedstock to materials boiling below 430° F. and to deposit about 20 to 60 pounds of coke on the catalyst per barrel of feedstock, regenerating said catalyst in a fluidized bed by burning coke therefrom while producing steam from water by indirect heat exchange with said catalyst undergoing regeneration and passing resulting steam to said catalytic cracking the amount of steam being produced by regeneration and sent to catalytic cracking providing the entire steam requirement for the cracking, withdrawing from the cracking system at the rate of about 20 to 200 percent of the catalyst inventory per day, said catalyst contaminated with vanadium and nickel metal poisons from said feedstock, treating said withdrawn catalyst to remove about 10 to 70 percent of the metal poisons, and returning the resulting demetallized catalyst to said catalytic cracking system.

2. The process of claim 1 in which demetallization includes a step wherein the catalyst is contacted at an elevated temperature with a gas reactive with said metal impurity.

3. A process according to claim 1 in which catalyst is withdrawn and demetallized at the rate of about 20 to 200% of the catalyst inventory daily.

4. The process of claim 1 wherein the residual petroleum stock has a boiling point essentially above about 400° F.

5. The process of claim 1 wherein about 25 to 40 pounds of coke are deposited on the catalyst per barrel of feed.

6. The process of claim 1 wherein steam is present in amounts of about 20 to 40% by weight of the oil and steam.

7. The method of claim 1 in which about 50–65% of the hydrocarbon feedstock is converted to materials boiling in the gasoline range.

8. The process of claim 7 wherein the silica-based cracking catalyst is about 20 to 150 microns in size.

9. A process for catalytically cracking a residual petroleum hydrocarbon having a boiling point essentially above about 400° F. which contains more than 1.5 parts per million vanadium and more than 0.6 part per million nickel which comprises subjecting the residual petroleum hydrocarbon and about 10–65% by weight of the cracking feedstock of steam to fluidized catalytic cracking employing a synthetic gel silica-alumina catalyst of fluidizable particle size under conditions to produce conversion of about 35–65% of the feedstock to materials boiling below 430° F. and to deposit about 20–60 pounds of coke on the catalyst per barrel of the feedstock, regenerating said catalyst in a fluidized bed by removal of coke under conditions suitable for production of steam from water by indirect heat exchange and passing steam so formed to said catalytic cracking the amount of steam being produced by regeneration and sent to catalytic cracking providing the entire steam requirement for the cracking, withdrawing from the cracking system a portion of the regenerated catalyst contaminated with said metal impurity, sulfiding the poisoning metal containing component on the catalyst by contact with a sulfiding agent at a temperature of about 500 to 1500° F., chlorinating poisoning metal containing component on the catalyst by contact with an essentially anhydrous chlorinating agent at a temperature of about 300 to 1000° F., contacting the catalyst with a liquid essentially aqueous medium to remove soluble poisoning metal chlorides from the catalyst and returning the demetallized catalyst to said catalytic cracking system.

10. The process of claim 9 in which the contaminated catalyst, subsequent to regeneration and prior to sulfiding, is contacted with a molecular oxygen-containing gas at a temperature of about 1000 to about 1800° F.

11. The process of claim 9 in which sulfiding is performed by contact with $H_2S$.

12. The process of claim 9 in which the chlorinating is performed with a mixture of $Cl_2$ and $CCl_4$.

References Cited in the file of this patent

UNITED STATES PATENTS

| | | |
|---|---|---|
| 2,466,050 | Shabaker et al. | Apr. 5, 1949 |
| 2,488,718 | Forrester | Nov. 22, 1949 |
| 2,488,744 | Snyder | Nov. 22, 1949 |
| 2,664,346 | Mayhew | Dec. 29, 1953 |
| 2,914,459 | Mills et al. | Nov. 24, 1959 |